United States Patent [19]
Kratzer et al.

[11] 3,791,719
[45] Feb. 12, 1974

[54] METHOD OF AND DEVICE FOR DETERMINING THE STATE OF REFRACTION OF A HUMAN EYE

[75] Inventors: Bernd J. L. Kratzer, Huttlingen; Heinz Ulffers, Aalen, both of Germany

[73] Assignee: Carl Zeiss-Sliftung, Wuerttemberg, Germany

[22] Filed: Sept. 13, 1972

[21] Appl. No.: 288,689

Related U.S. Application Data

[63] Continuation-in-part of Ser. No. 86,217, Nov. 2, 1970, abandoned.

[30] Foreign Application Priority Data
Nov. 6, 1969   Germany.................. P 19 55 859.9

[52] U.S. Cl................... 351/11, 250/204, 250/221, 351/1, 351/6, 351/9, 351/16, 351/28, 351/29, 351/39
[51] Int. Cl.......... A61b 3/10, A61b 3/02, G01j 1/36
[58] Field of Search......... 351/1, 6, 7, 9, 10, 11, 16, 351/28, 29, 39; 250/204, 221

[56] References Cited
UNITED STATES PATENTS
3,524,702   8/1970   Bellows et al........................... 351/6

FOREIGN PATENTS OR APPLICATIONS
251,860   2/1970   U.S.S.R............................... 351/1

OTHER PUBLICATIONS

Niles Roth, "Autom. Optom for Use with the Undrugged Human Eye," Review Scient. Inst., Vol. 36, No. 11, p. 1636–1641, Nov. 1965.

*Primary Examiner*—Paul A. Sacher
*Attorney, Agent, or Firm*—Hill, Sherman, Meroni, Gross & Simpson

[57] ABSTRACT

For determining the state of refraction of a human eye there is first effected automatically a coarse balancing operation and subsequently a fine balancing operation is performed manually with the same apparatus. Said apparatus may be a phoropter or another known device for determining the state of refraction of a human eye. A refractometer attachment is connected to said device and effects automatically the objective coarse balancing operation. The fine balancing operation of said device is performed manually after switching off said attachment.

9 Claims, 4 Drawing Figures

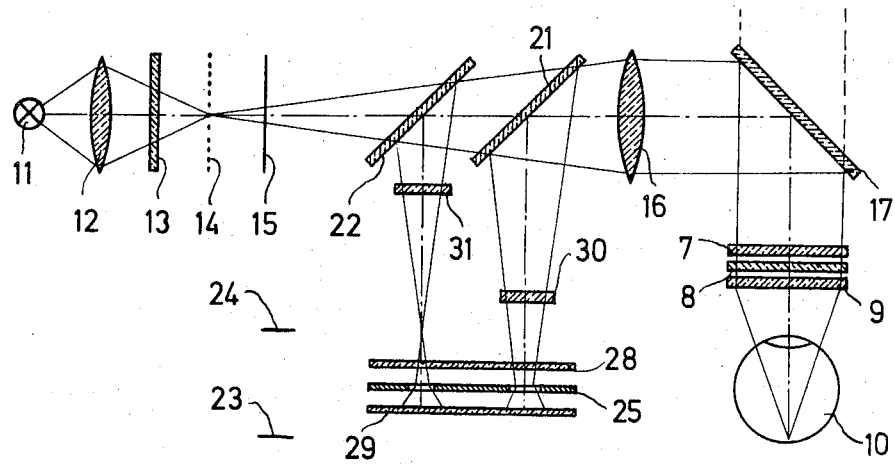
Fig. 3
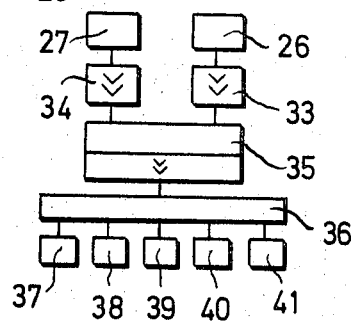
Fig. 4
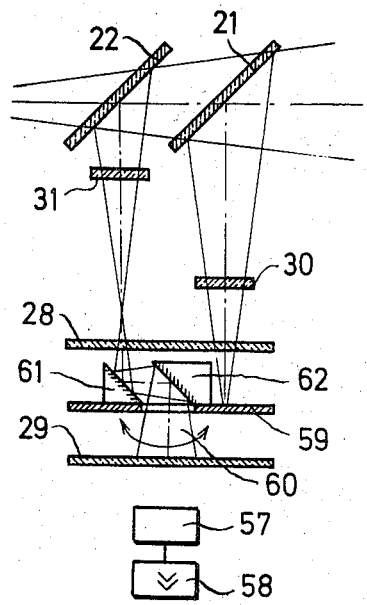

METHOD OF AND DEVICE FOR DETERMINING THE STATE OF REFRACTION OF A HUMAN EYE

The invention relates to a method of and device for determining the state of refraction of a human eye and constitutes a continuation-in-part of now abandoned U.S. Pat. application Ser. No. 86,217 filed Nov. 2, 1970.

When determining the state of refraction of human eyes, it is common practice to first objectively measure the refractive power by means of a refractometer or a skiascope. This measurement requires a certain minimum period of time and also involves systematic measuring errors probably due to physiological-optical characteristics of the eye. Therefore, a subjective fine balancing operation should always follow, and can be carried out, by way of example, by means of testing spectacles or a phoropter.

It is obvious that this determination of refraction is highly time-consuming, and such a long time is not available in the practice of the refractionist, particularly in the practice of the ophthalmologist.

An object of the invention is a method of and a device for determining the state of refraction of a human eye which substantially reduces the time required by the refractionist and is neither an additional burden on the refractionist nor on the patient.

In accordance with the invention, first an objective coarse balancing operation is effected by automatically placing corrective eye lenses in alignment with the patient's eye and subsequently a subjective fine balancing operation is performed by manually changing the power of said lenses until optimum correction is achieved with the same apparatus.

With the novel method, the patient need only be seated in front of one single apparatus. This apparatus performs a preliminary balancing operation which will be very close to the final correct prescription within a few seconds; thus, in effect, within a time period which the refractionist needs anyway for preparing the patient. The patient is not burdened at all by the automatic coarse balancing operation.

Thereafter, the refractionist carries out the fine balancing operation with the same apparatus by subjective refraction; the total consumption of time being relatively small.

As compared with the conventional method of determining the state of refraction of an eye, the novel method is, therefore, primarily characterized by a substantially smaller consumption of time and by a reduced burden on patient as well as on refractionist.

To carry out the novel method indicated, various ophthalmic instruments known per se can be used. Thus, it is possible to use a phoropter comprising two disks adapted to be rotated about the same axis, having differently stepped spherical glasses, and a disk having cylindrical glasses of different refractive power. It is also possible to use an apparatus comprising variosystems consisting of liquid or solid components, and which accordingly permits a continuous change in the refractive power.

In accordance with the present invention there is provided an ophthalmic instrument having corrective lenses which are positionable in alignment with the eyes of the patient being examined. The instrument includes servomotors for moving selected lenses in front of the eye. An automatically operating refractometer attachment is provided which when placed in alignment with the patient's eye delivers a signal to the servomotors which move objectively selected corrected lenses in front of the eye to achieve a rough refraction. The apparatus also includes a control unit for manually actuating the servomotors after switching-off the automatically operating refractometer. The manually operated control unit is used to move selected corrective lenses in front of the patients eyes to effect a subjective fine balancing.

Thus, in the novel device first signals are generated by means of the refractometer attachment which are corresponding to the state of refraction of the eye. These signals control the servomotors which serve to place corrective lenses in front of the eye in order to correct the imperfect vision of the patient tested. When this automatically occurring coarse balancing operation has been completed, the subjective fine balancing operation is effected by remote control of said servomotors.

In order to avoid disturbances of the accommodation of the patient's eyes by the coarse balancing operation, the refractometer attachment has an infrared light source.

The refractometer attachment is adapted to operate according to various methods.

Thus, it is possible to apply a coincidence method in which an object is imaged in the eye through a Scheiner-stop. Said stop comprising a plate with two small holes spaced apart a distance which is smaller than the diameter of the pupil of the eye under test. See ABC Der Optik; 1961, page 764. When imaging the retinal image on an array of photocells, an electric control signal can be obtained from the position of the images.

Also a measurement of the modulation transfer function of the eye is possible. Thereby, a slit is imaged in the eye and the retinal image is focussed onto a rotating scanning screen. The current supplied by a photocell arranged behind the screen may then serve to control the servomotors.

However, the refractometer technique has shown to be particularly adavantageous. An attachment operating by this method comprises a test object, an objective for forming an image of the test object toward the infinite, a partially transmitting mirror for deflecting the light originating from the test object into the patient's eye, two further partially transmitting mirrors arranged in the path of rays between the test object and the objective, for deflecting the light reflected by the eye onto a double-apertured stop, as well as photoelectric detectors arranged behind this double-apertured stop, which are succeeded by a circuit for processing the signals generated.

If the eye under examination is not emmetropic, then the photoelectric detectors of the refractometer attachment indicated will generate different signals actuating the respective servomotors.

In order to also permit determination of astigmatic errors of the eye by means of the novel device, a cross cylinder is arranged in each partial path of rays between the partially transmitting mirror and the stop. By means of this cross cylinder signals are generated actuating servomotors which change the cylinder effect and the cylinder axis of the systems connected in front of the eye.

The invention will now be described in greater detail with reference to the FIGS. 1 to 4 of the accompanying drawings, in which FIG. 1 is a diagrammatic elevation view of the device for practicing the method of the invention;

FIG. 3 is a schematic representation of the optical structure of the refractometer attachment; and FIG. 4 is another embodiment of the device illustrated in FIG. 3.

Figure 1:
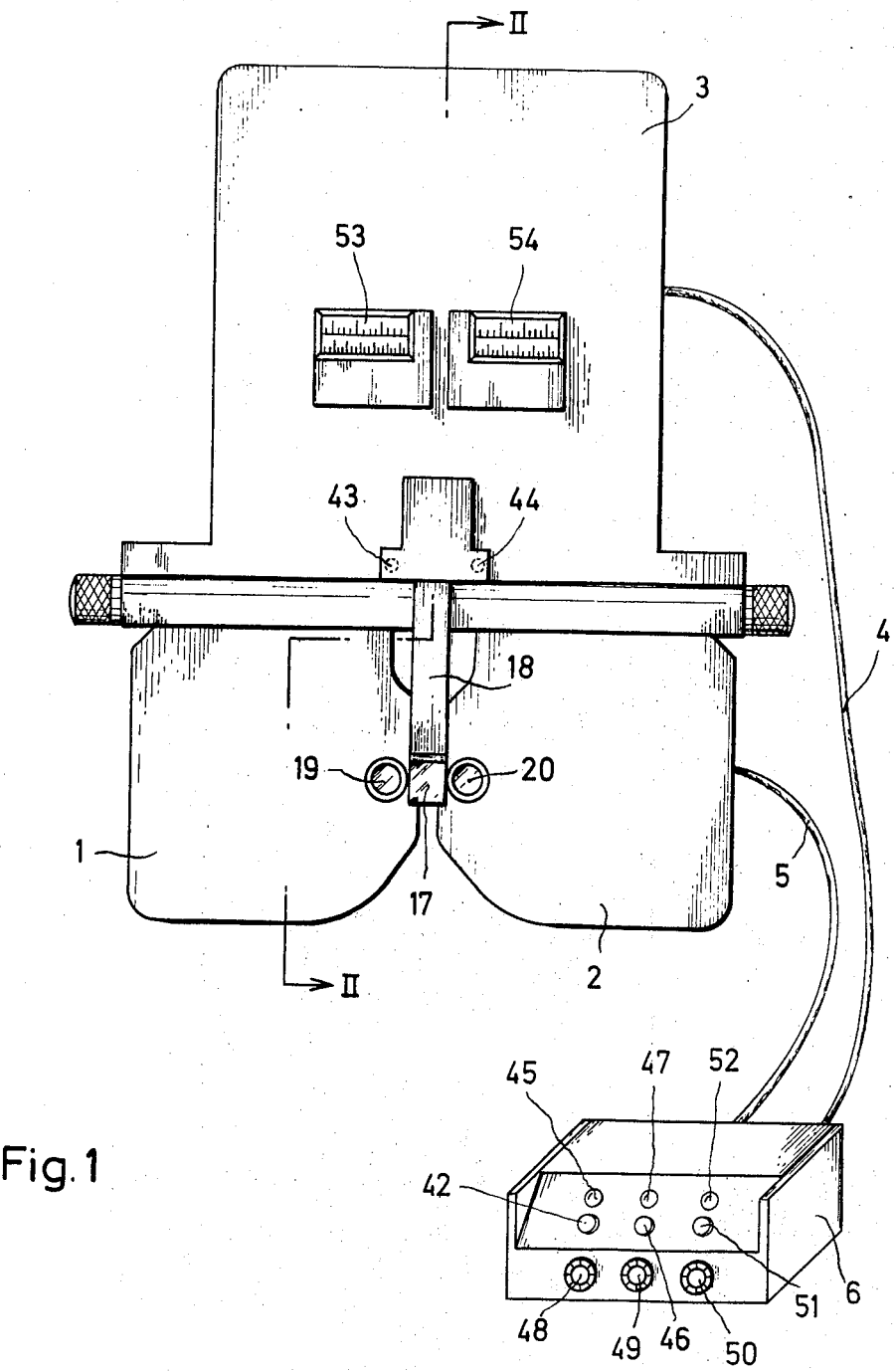

In FIG. 1, reference numerals 1 and 2 designate the two halves of a phoropter on which the refractometer attachment referenced 3 is mounted. Electric cables 4 and 5 are used to connect the refractometer attachment 3 and the phoropter 1, 2 with a control unit 6.

Each half of the phoropter 1, 2 comprises two disks 7, 8 (FIG. 2) adapted to be rotated step by step about the same axis, of which the one disk has mounted therein a circumferential series of spherical glasses of large differences in refractive power, while the second disk has weak spherical glasses of small differences in refractive power, by which the great steps of the first disk can be divided. A third disk having cylindrical glasses of different refractive power is referenced 9. These cylindrical glasses, similarly to planet gears, are adapted to be simultaneously rotated about their optical axis by means of a central sun wheel or other mechanical means in such a manner that with the insertion in front of the eye 10 under examination each of these cylindrical glasses has the same axial position. Servomotors are provided for rotation of the disks 7, 8, 9 as well as for rotation of the sun wheel rotating the disk 9. To accurately fix the positions of the disks, microswitches are preferably used which accurately limit the rotary movement of the servo-motors and therewith that of the disks.

The refractometer attachment 3 mounted above the phoropter comprises an infrared light source 11 (FIG. 2), a collimator lens 12, an infrared filter 13, a test object 14, an interrupter 15 as well as an objective 16. This objective forms an image of the test object 14 toward the infinite. A partially transmitting mirror 17 is used to deflect the infrared light originating from the test object into the patient's eye 10. The mirror 17 is arranged on a support 18 which is movable alternatively before the opening 19 or 20 of the phoropter 1, 2 (FIG. 1) and therewith before the left or the right eye of the patient.

Reference numerals 21 and 22 designate two partially transmitting mirrors which deflect the light reflected by the eye 10 onto a double-apertured stop 25. When assuming an emmetropic eye 10 or a fully corrected eye, a respective image of the test object 14 will be formed in the planes 23 and 24. The planes 23 and 24 are oppositely equidistant from the double-apertured stop 25. In the assumed case the same light flux passes through the two apertures of the double-apertured stop 25, so that the signals generated by the secondary electron multipliers 26 and 27 are of equal magnitude.

In front of the double-apertured stop 25 a color filter reference 28 is arranged used to filter out extraneous light. Reference numeral 29 designates a ground glass plate.

In each partial path of rays a cross cylinder 30 or 31 is adapted to be inserted and arranged for rotation between the partially transmitting mirrors 21 and 22, respectively, and the double-apertured stop 25.

Figure 2:
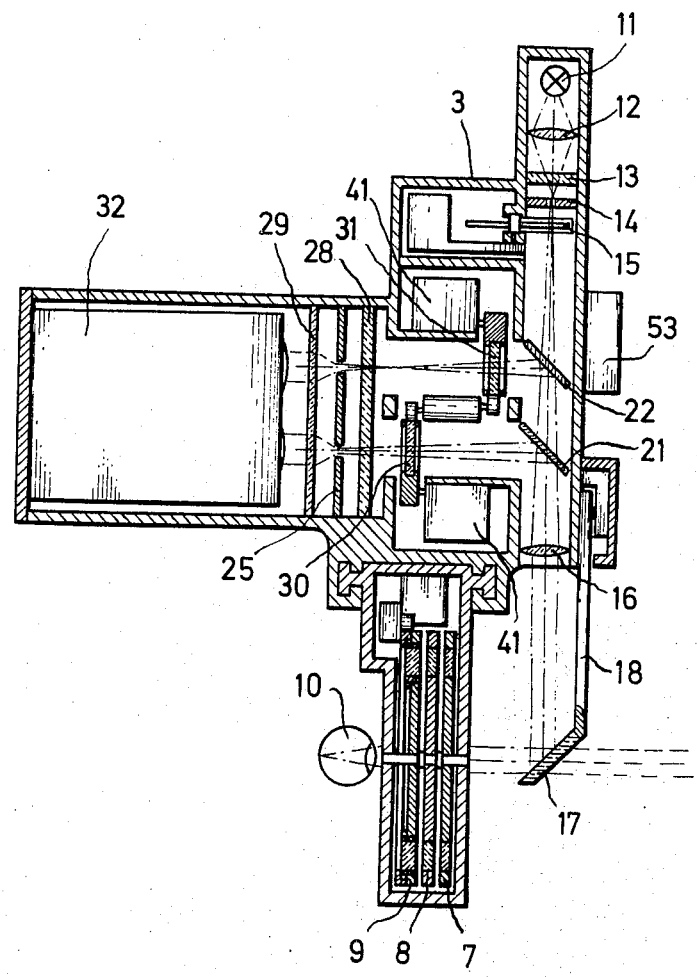
FIG. 2 is a vertical sectional view of the device along the line II—II of FIG. 1.

The electronic system reference 32 in FIG. 2 comprises the two amplifiers 33, 34, a differential amplifier 35 and a logic 36, as shown in FIG. 3. Electric motors 37 to 40 used to rotate the disks 7, 8, 9 are connected to the outputs of the logic. The servomotor referenced 41 is used for insertion and axial rotation of the cross cylinders 30 and 31.

The mode of operation of the device illustrated in the FIGS. 1 to 3 is as follows:

After the patient has taken a seat behind the phoropter 1, 2 he looks through the openings 19 and 20 on an optometric wall chart, whereby his eyes are fixed as to direction of view and accommodation. For the purpose of switching on the automatically actuated members, the refractionist now presses the button 42 of the control unit 6. Then he moves the lever 18 manually, for instance, first towards the left. This results in an actuation of the microswitch 43 which effects an operation of the servomotors for the left phoropter half 1.

The refractometer attachment 3 is also actuated. This causes the infrared light source 11 to emit light which is periodically interrupted by the interrupter 15. By means of the objective 16, the mirror 17 and the eye 10 of the patient an image of the test object 14 is formed on the retina of eye 10. When the patient has a perfect vision, i.e., when his eye 10 is emmetropic there will be a sharp image of test object 14 on the retina and the light rays reflected from the retina will be parallel. In this case two images of the test object will be formed in the planes 23 and 24 by means of the objective 16 and the mirrors 21 and 22.

If the eye 10 is not emmetropic the two images of the test object are not formed in the two planes 23 and 24. In this case the light flux through the two apertures of stop 25 is not equal and the signals generated by the secondary electron multipliers 26 and 27 are of different amplitudes. As the light is periodically interrupted the two amplifiers 33 and 34 function as a.c., amplifiers.

The voltages from these amplifiers are transmitted to differential amplifier 35. The difference signal from this amplifier is delivered to the logic 36. This circuit determines from the polarity and the amplitude of the difference signal which of the servomotors 37 – 40 is to be actuated. By means of the actuated servomotors, the disks 7 and 8 of the phoropter 1 are rotated to thus position corrective lenses in front of the eye 10. These corrective lenses correct the imperfect vision of eye 10 until it is fully corrected and the difference signal falls below a preestablished value. Accordingly, the cross cylinders 30 and 31 are inserted for instance automatically. If the signal generated does not exceed a preselected level, the cross cylinders will be rotated through 45°. If also in this case the signal strength remains below a preestablished value, no cylinder balancing will be necessary. If however, after insertion of the cross cylinder, the difference signal exceeds a preestablished value, the corrective cylinder axes of the glasses mounted in the disk 9 will be adjusted horizontally (0° OKa -sheme, i.e., 0° on the standard —Ophthalmological Congress in Amsterdam diagram). Thereafter, the disk 9 is rotated by the servomotor 41 until the amplitude of the difference signal drops below a preset value. Then, the cross cylinder axes of the disk 9 are rotated until equivalence of the signals generated by the detectors 27 and 26 is achieved. Now, the cylinder balancing is completed.

Therewith, the automatic balancing operation for the left side is completed and the mirror 17 is moved either automatically or manually towards the right before the opening 20. This causes an actuation of the microswitch 44 and an operation of the servomotors for the right phoropter half 2. Now, the automatic coarse balancing operation described herein proceeds for the right eye.

After completion of the coarse balancing operation a pilot lamp 45 lights up. Now, the refractionist presses the control knob 46, whereupon the pilot lamp 47 lights up and indicates that he may now carry out the subjective fine balancing operation for the left eye manually. This fine balancing operation is effected by turning the control knobs 48, 49, 50. This causes one of the servomotors 37 to 41 to be actuated and rotates one of the disks 7, 8, 9 in such a manner that instead of the automatically selected corrective lens the next corrective lens on said disk is placed in front of the left eye of the patient. In the well known manner of subjective refraction the fine balancing operation is effected.

After completion of the fine balancing operation for the left eye, when the knob 51 has been pressed and the pilot lamp 52 has lighted up, the subjective fine balancing operation for the right eye is effected also by turning the knobs 48, 49, 50.

After completion of these fine balancing operations, the values found for the corrective lenses are read in the windows 53 and 54.

It is also possible, instead of reading the values found, to print the same directly on the prescription blank by a connected printer.

In the device illustrated in FIGS. 2 and 3, two secondary electron multipliers 26 and 27 are provided for the signal generation. Now, FIG. 4 illustrates another embodiment in which only one secondary electron multiplier 57 is provided. By using only one detector, difficulties resulting from the difference between two detectors can positively be avoided.

In the embodiment illustrated in FIG. 4, a rotating disk 59 having a central opening 60 is arranged between the color filter 28 and the ground glass plate 29. The disk 59 is provided with a deflecting system comprised of the mirrors 61, 62. Instead of these mirrors, also a prism can be used.

By rotation of the disk 59 the light coming from the partially transmitting mirrors 21, 22 is alternatingly supplied to the secondary electron multiplier 57. Thus, without the interrupter 15 of FIG. 3 an alternating signal is generated. The amplifier 58 is suitably triggered by the disk 59 in such a manner that it separately processes the two signals and simultaneously feeds the same to the succeeding differential amplifier 35.

Under certain circumstances it may be expedient to cause the test object to rotate in order to avoid an accommodation stimulus for the eye under examination. In such a case, it is necessary to also cause the stop 25 to rotate.

What we claim is:

1. The method of correcting for the state of refraction of a human eye, comprising the steps of directing infrared light into said eye so that an image of a test object is produced on the retina of the eye, directing the light reflected by said eye onto a double apertured stop so that the same amount of light flux passes through each aperture of said stop when said eye is emmetropic, transmitting the light passing through each of said apertures into separate photoelectric receivers, feeding in case of a non-emmetropic eye the difference signal of the signals produced by said two receivers to motor means, sequentially placing corrective lenses in front of said eye under the influence of said motor means until the said difference signal falls below a predetermined value, and thereafter manually actuating said motor means to place corrective lenses of which the power differs slightly from the power of said sequentially placed lenses in front of said eye until optimum correction of the imperfect vision is effected.

2. The method of correcting for the state of refraction of a human eye, comprising the steops of directing infrared light into said eye in such a way that an image of a test object is produced on the retina, splitting the light reflected by said eye into two light beams, directing these two beams alternatingly onto a photoelectric receiver whereby the receiver produces a pulsating d.c. signal if said eye is emmetropic and an a.c. signal if the eye is non-emmetropic, feeding in case of a non-emmetropic eye the a.c. signal produced by said receiver to servomotors for placing automatically corrective lenses in front of said eye until the amplitude of said a.c. signal falls below a predetermined value, and thereafter manually actuating said servomotors to place corrective lenses of which the power differs slightly from the power of said automatically selected lenses in front of said eye until optimum correction of the imperfect vision is effected.

3. A device for determining the state of refraction of a human eye, comprising an opththalmic instrument including servomotors driving means sequentially varying corrective lens means in front of said eye, a refracto-meter attachment provided with a reflecting means movable selectively in alignment with each eye to be tested, said attachment comprising a source of infrared light, a test object on the retina of the eye under test, partly transmissive mirrors located in axially spaced points along the infrared beam between said source of infrared light and said eye and serving to split the infrared light beam reflected back from said eye into two light beams, photoelectric means sensing said light beam and means for producing a correcting difference signal when said eye under test is non-emmetropic, means for feeding said correcting signal to said servomotors of said ophthalmic instrument for sequentially varying said corrective lens means in front of said eye until the imperfect vision of the eye is coarsely balanced and corrected whereby said correcting signal drops below a predetermined amplitude value, and means for manually actuating said servomotors of said ophthalmic instrument whereby a fine balancing operation may additionally be performed by subjective refraction.

4. A device according to claim 3 in which a double apertured stop is arranged behind said mirrors in a plane which is equidistant from the planes into which said test object is imaged when the eye under test is emmetropic, and in which said photoelectric sensing means includes a receiver arranged behind each aperture of said stop.

5. A device according to claim 3, in which a rotating aperture is arranged behind said mirrors by means of which the light of said two light beams is alternatingly fed to a single photoelectric receiver.

6. A device according to claim 3, wherein a cross cylinder is mounted for insertion and rotation into each of said two split light beams between said mirrors and said photoelectric means and is adjustably rotatable when inserted therein.

7. A device according to claim 3 in which said corrective means comprises lenses in which the refractive power is continuously variable by means of said servomotors.

8. A device according to claim 3 in which said corrective lens means comprises a plurality of lenses of different refractive power which are moved sequentially in front of said eye under test by means of said servomotors.

9. A device for determining the state of refraction of a human eye, comprising an ophthalmic instrument including a plurality of axially aligned, individually rotatable disks each carrying a series of lenses, said lenses having sequentially different refractive power and each one of said lenses being mounted for sequential placement in front of the eye to be tested upon rotation of its respective disk, servomotors for rotating said disks, and a refractometer attachment connected to said instrument, said refractometer comprising a source of infrared light and a movably mounted reflecting means for reflecting a beam of infrared light selectively into the left eye and into the right eye of the patient, a collimator lens, a test object, an interruptor for the beam of infrared light, and another objective in the order named being disposed between said source of infrared light and said movable reflecting means for imaging said test object with infrared light into the retina of the slected eye, and two partially light transmitting mirrors axially spaced along and in said beam of infrared light between said interruptor and said other objective for directing a portion of the infrared light reflected from the retina through a double aperture stop into photoelectric means for producing a correcting signal when the eye under test is non-emmetropic, means feeding said correcting signal to said servomotors of said ophthalmic instrument for rotating said disks whereby the lenses therein are placed successively in front of the eye until the imperfect vision of said eye is at least coarsely corrected, and means for manually operating said servomotors to perform a fine correction by objective refraction.

\* \* \* \* \*